(12) United States Patent
Bastoreala et al.

(10) Patent No.: US 11,313,268 B2
(45) Date of Patent: Apr. 26, 2022

(54) METHOD OF MONITORING AN SCR CATALYST

(71) Applicant: Robert Bosch GmbH, Stuttgart (DE)

(72) Inventors: Arthur Bastoreala, Remseck am Neckar (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 16/871,275

(22) Filed: May 11, 2020

(65) Prior Publication Data
US 2021/0095590 A1    Apr. 1, 2021

(30) Foreign Application Priority Data

May 9, 2019 (DE) .......................... 102019206683.6

(51) Int. Cl.
*F01N 11/00* (2006.01)
*G01M 15/10* (2006.01)
*F01N 3/20* (2006.01)

(52) U.S. Cl.
CPC .......... *F01N 11/005* (2013.01); *F01N 3/2066* (2013.01); *F01N 11/00* (2013.01); *G01M 15/102* (2013.01); *F01N 2550/02* (2013.01); *F01N 2560/021* (2013.01); *F01N 2560/026* (2013.01); *F01N 2900/0414* (2013.01); *F01N 2900/1402* (2013.01); *F01N 2900/1404* (2013.01); *F01N 2900/1616* (2013.01); *F01N 2900/1622* (2013.01)

(58) Field of Classification Search
CPC ...... F01N 11/005; F01N 3/2066; F01N 11/00; F01N 2550/02; F01N 2560/021; F01N 2900/0414; F01N 2900/1402; F01N 2900/1404; F01N 2900/1616; F01N 2900/1622; F01N 2610/02; F01N 2900/0601; F01N 2900/16; Y02T 10/12; Y02T 10/40
See application file for complete search history.

(56) References Cited

U.S. PATENT DOCUMENTS

| | | | |
|---|---|---|---|
| 2010/0101214 A1 | 4/2010 | Herman et al. | |
| 2016/0169073 A1* | 6/2016 | Chanzy ................ | F01N 11/002 60/274 |

FOREIGN PATENT DOCUMENTS

DE    102013108483 A1    5/2014

* cited by examiner

*Primary Examiner* — Brandon D Lee
(74) *Attorney, Agent, or Firm* — Michael Best & Friedrich LLP (57) ABSTRACT

A method of monitoring an SCR catalyst in which an area factor (a) of the SCR catalyst is ascertained by means of an observer. It is concluded that there is a fault in the SCR catalyst when a comparison shows that the area factor (a) has gone below a threshold value (S).

9 Claims, 7 Drawing Sheets

METHOD OF MONITORING AN SCR CATALYST

BACKGROUND OF THE INVENTION

The present invention relates to a method of monitoring an SCR catalyst. The present invention further relates to a computer program that executes each step of the method, and to a machine-readable storage medium that stores the computer program. Finally, the invention relates to an electronic control device set up to execute the method.

In order to fulfill ever stricter exhaust gas legislation, it is necessary to reduce the level of nitrogen oxides in the exhaust gas from internal combustion engines, especially from diesel engines. A known method for this purpose is to position an SCR catalyst (selective catalytic reduction) in the exhaust gas conduit, which reduces nitrogen oxides present in the exhaust gas to nitrogen in the presence of a reducing agent. For the reaction to progress, ammonia is required as reducing agent, which is used in the form of ammonia-releasing reagents. This purpose is generally fulfilled using an aqueous urea solution which is injected into the exhaust gas conduit downstream of the SCR catalyst.

The use of SCR catalysts currently also requires the use of at least one nitrogen oxide sensor. Frequently, however, one nitrogen oxide sensor is used upstream and one downstream of the SCR catalyst. Aged or damaged SCR catalysts can be recognized by evaluating the nitrogen oxide mass flow rates upstream and downstream of the SCR catalyst.

In a "passive" method, the nitrogen oxide conversion rate or nitrogen oxide concentration or nitrogen oxide mass flow rate downstream of the SCR catalyst is measured in phases in which sufficient distinction between an intact SCR catalyst and a faulty one is possible. An intact SCR catalyst which is also referred to as WPA (worst performing acceptable) has a higher nitrogen oxide conversion than the faulty SCR catalyst to be recognized, which is also referred to as BPU (best performing unacceptable). Since nitrogen oxide sensors are cross-sensitive to ammonia, an ammonia slip downstream of the SCR catalyst may result in a perceptibly lower efficiency. As a result, both a WPA catalyst and a BPU catalyst appear to be worse than they actually are. One consequence of this is that a BPU catalyst is easier to recognize, but on the other hand there is the risk that a WPA catalyst will be wrongly classified as BPU. Therefore, it is the aim of passive methods to choose the conditions such that no ammonia slip occurs in the measurement.

If the accuracy of such a passive method is insufficient, it is possible to employ an active method which, with the aid of active interventions into the amount of the aqueous urea solution dosed, ascertains the ammonia storage capacity of the SCR catalyst. This correlates very well with thermal or chemical damage to the SCR catalyst.

SUMMARY OF THE INVENTION

In the method of monitoring an SCR catalyst, an area factor of the SCR catalyst is ascertained by means of an observer. It is concluded that there is a fault in the SCR catalyst when a comparison shows that the area factor has gone below a threshold value. An observer is understood here to mean a system that uses known input parameters and output parameters of an observed reference system, the SCR catalyst in the present context, to reconstruct an unmeasurable parameter, the area factor in the present context. For this purpose, it models the reference system observed and, using a controller, tracks the measurable state variables that are therefore comparable with the reference system. An area factor is understood to mean a correction factor that represents damage to the SCR catalyst and is proportional to the catalytically active area of the SCR catalyst. An area factor which is used to assess the SCR catalyst in an on-board diagnosis (OBD) may be 1, for example in the case of a WPA catalyst, and have a value close to 0 in the case of a BPU catalyst. The threshold value in this case may, for example, be 0.5.

The method not only does not need active intervention into the dosage rate for the SCR catalyst, but also enables a more robust distinction between WPA catalysts and BPU catalysts. The use of the observer has the advantage here of a closed-loop control circuit, which means that short-lived errors in the calculation of the area factor have less of an effect than would be the case in calculations by means of open-loop control circuits. Moreover, the area factor is a parameter that directly characterizes the degree of damage to the SCR catalyst, which is superior to methods in which the SCR catalyst efficiency first has to be ascertained in order then to derive the age of the catalyst therefrom.

The area factor is the correction factor for the parameters of the physical SCR model (reaction kinetics model) that represents the catalytically active surface area of the SCR catalyst. The observer varies this area factor to fit the model to the measurement. The area factor affects several parameters. For instance, in the physical model, as well as the surface area, it is also possible to correct the reaction rates. In a performance map model, it is possible to correct not only the maximum storage capacity but also the nitrogen oxide conversion. The observer value is then converted to the physical parameters via a conversion, especially by means of a characteristic curve.

The area factor is ascertained in that a difference between a modeled exhaust gas signal upstream of the SCR catalyst and a measured exhaust gas signal downward of the SCR catalyst is ascertained and the difference is amplified by the observer. The exhaust gas signal here is especially a cumulative signal of a nitrogen oxide signal and an ammonia signal. It is thus possible here to utilize the parameters that are ascertained in any case for the operation of the SCR catalyst for monitoring thereof.

The quality of the observer and hence the accuracy of the monitoring depend very significantly on the accuracy of the modeling. The amplification may be varied such that phases with a high expected model accuracy are taken into account to a higher degree than phases in which the model accuracy is limited. In the extreme case, the observer can be deactivated and frozen in these phases. This can be done, for example, when the nitrogen oxide sensors of the SCR catalyst are not enabled or its dosage of aqueous urea solution is not enabled. Preferably, the amplification depends on at least one value selected from the group consisting of a temperature of the SCR catalyst, a temperature gradient of the SCR catalyst, a nitrogen oxide mass flow rate upstream of the SCR catalyst and a modeled ammonia mass flow rate downstream of the SCR catalyst. A high temperature of the SCR catalyst reduces its ammonia storage capacity. In the case of high temperature gradients, there is competition between the catalytic reduction of nitrogen oxides and ammonia desorption, which complicates the modeling. It is therefore particularly preferable that the observer is restricted when the temperature gradient exceeds a gradient threshold value. If it continues to exceed the temperature gradient threshold value for a definable period of time, it may be the case that the area factor is put back to a value stored beforehand when the gradient threshold value was first exceeded. As a result, the observer is not blocked immediately in the event of every brief high temperature gradient.

If the SCR catalyst were empty in the case of possible damage, there is a further restriction in its observability. In this case, the nitrogen oxide concentration at the outlet from the SCR catalyst is equal to the nitrogen oxide concentration at its inlet. The ammonia concentration downstream of the SCR catalyst therefore derives directly from the dosage of the aqueous urea solution. In this case, a change to the model of the SCR catalyst on the part of the observer cannot bring about any change in the output signals and activation of the observer is inappropriate. It is therefore preferable that a model of a BPU catalyst is calculated. If the ammonia fill level of this model is below a fill level threshold value, the observer is preferably frozen.

If ammonia is being stored owing to a positive temperature gradient in the SCR catalyst, the ammonia slip downstream of the SCR catalyst in the case of an intact SCR catalyst may be greater than in the case of a faulty SCR catalyst in which less ammonia is stored. The exhaust gas signal in the case of the intact SCR catalyst (WPA) is accordingly higher than in the case of the faulty SCR catalyst (BPU). The observer will interpret this as a sign of lower ammonia storage capacity and therefore incorrectly reduce the area factor. In order to avoid this situation, it is preferable that a model of a WPA catalyst is calculated. If the modeled ammonia slip of this model is above a slip threshold value, the observer is frozen. This threshold value can especially be determined on the basis of a further model of a partly damaged SCR catalyst, the area factor of which is between the limiting BPU and WPA cases. Thus, if the ammonia slip of the WPA model is above that of this intermediate SCR catalyst, the observer is preferably frozen.

It is further preferable that the observer is influenced on the basis of the current tolerance situation of the ammonia fill level of the SCR catalyst. The accuracy of the ammonia fill level modeled has an influence on the accuracy of the observer's model. It is therefore advantageous to restrict the observer in situations with relatively high inaccuracies of the modeled ammonia fill level, or to implement lower amplification of the difference in the signals. For this purpose, it is particularly preferable that two additional SCR catalyst models are calculated. One of the two models takes account of the tolerance characteristics that lead to a maximum ammonia fill level. The other model is based on the tolerance characteristics that lead to a minimum ammonia fill level. The absolute or relative difference between the two model values thus obtained can thus be used as yardstick for the current tolerance situation of the ammonia fill level model and hence as a basis for the enablement of the observer.

As a further enablement condition, the observer should be allowed to operate only when the sensor value or the output from the model of a BPU catalyst exceeds a particular threshold. If this condition is not met, the sensor tolerances are dominant compared to the observer variance and the result is not trustworthy. The requesting of the two values (measurement value and BPU model value) assures teaching-in in the OK case and in the fault case. Restriction of the observer is also possible depending on the two model values mentioned (for example via the maximum).

An upper and lower limit for a limitation of the area factor can especially be found through use of an anti-windup, which can be implemented by freezing the observer.

Preferably, the observer has an integrator. This can give a weighted sum of a variance between the modeled exhaust gas signal and the measured exhaust gas signal. Restriction of the observer can be implemented here by altering the observer amplification depending on various conditions.

The comparison of the area factor with the threshold value is preferably made only after a teach-in phase for the observer has elapsed. This enables adjustment of the area factor by multiple modeling runs to a value of maximum robustness. It may also be the case that a new teach-in phase is started when a significant change in the area factor is detected. This would suggest an abrupt change in the state of the SCR catalyst, which may necessitate new teaching-in.

In order to enable teaching-in with as short as possible a teach-in phase, it is preferable that the area factor is initialized to the threshold value. Alternatively, it may also be the case that the area factor is stored in a nonvolatile memory when the SCR catalyst system is switched off and initialization is effected with the stored value when the SCR catalyst system is restarted.

The computer program is set up to perform each step of the method, and especially runs on a computer device or an electronic control device. It enables the implementation of different embodiments of the method on an electronic control device without having to undertake any changes to the construction thereof. For this purpose, it is stored on the machine-readable storage medium. By loading the computer program onto a conventional electronic control device, the electronic control device set up to monitor an SCR catalyst by means of the method is obtained.

DETAILED DESCRIPTION

Figure 1:
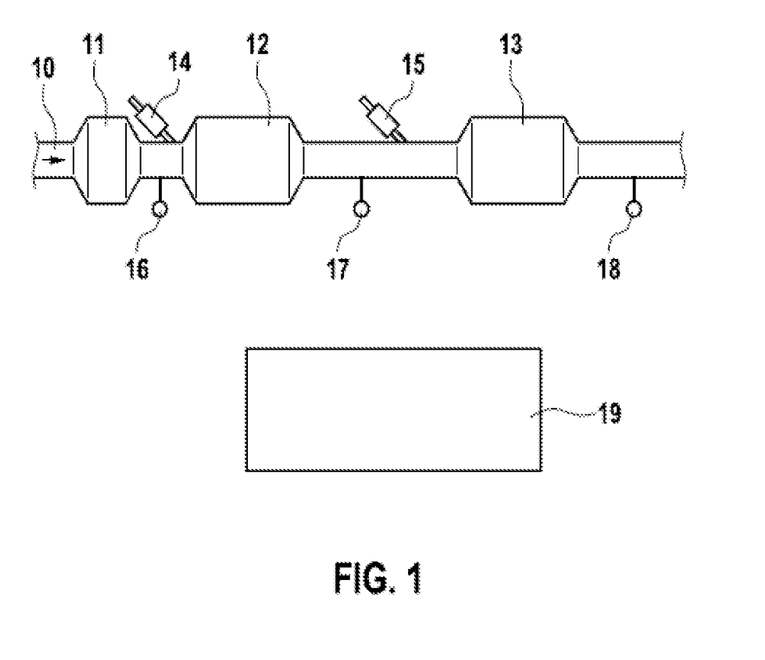
FIG. 1 shows a schematic of an SCR catalyst system in which an SCR catalyst can be monitored by means of a working example of the method of the invention.

FIG. 1 shows an exhaust gas conduit 10 in which multiple catalysts, namely a diesel oxidation catalyst (DOC) 11, an SCR catalyst (SCRF) 12 disposed on the diesel particulate filter, and a further SCR catalyst 13, are disposed in succession. Between the diesel oxidation catalyst 11 and the first SCR catalyst 12 is disposed a first dosage module 14. Between the two SCR catalysts 12, 13 is disposed a second dosage module 15. The two dosage modules 14, 15 are set up to meter an aqueous urea solution into the exhaust gas conduit 10 upstream of each of their respective SCR catalysts 12, 13. Nitrogen oxide sensors 16, 17, 18 are disposed between the diesel oxidation catalyst 11 and the first dosage module 14 between the first SCR catalyst 12 and the second dosage module 15 and downstream of the second SCR catalyst 13. An electronic control device 19 controls the dosage modules 14, 15 and receives sensor data from the nitrogen oxide sensors 16, 17, 18. In the electronic control device 19, methods can proceed according to different working examples of the invention.

Figure 2:
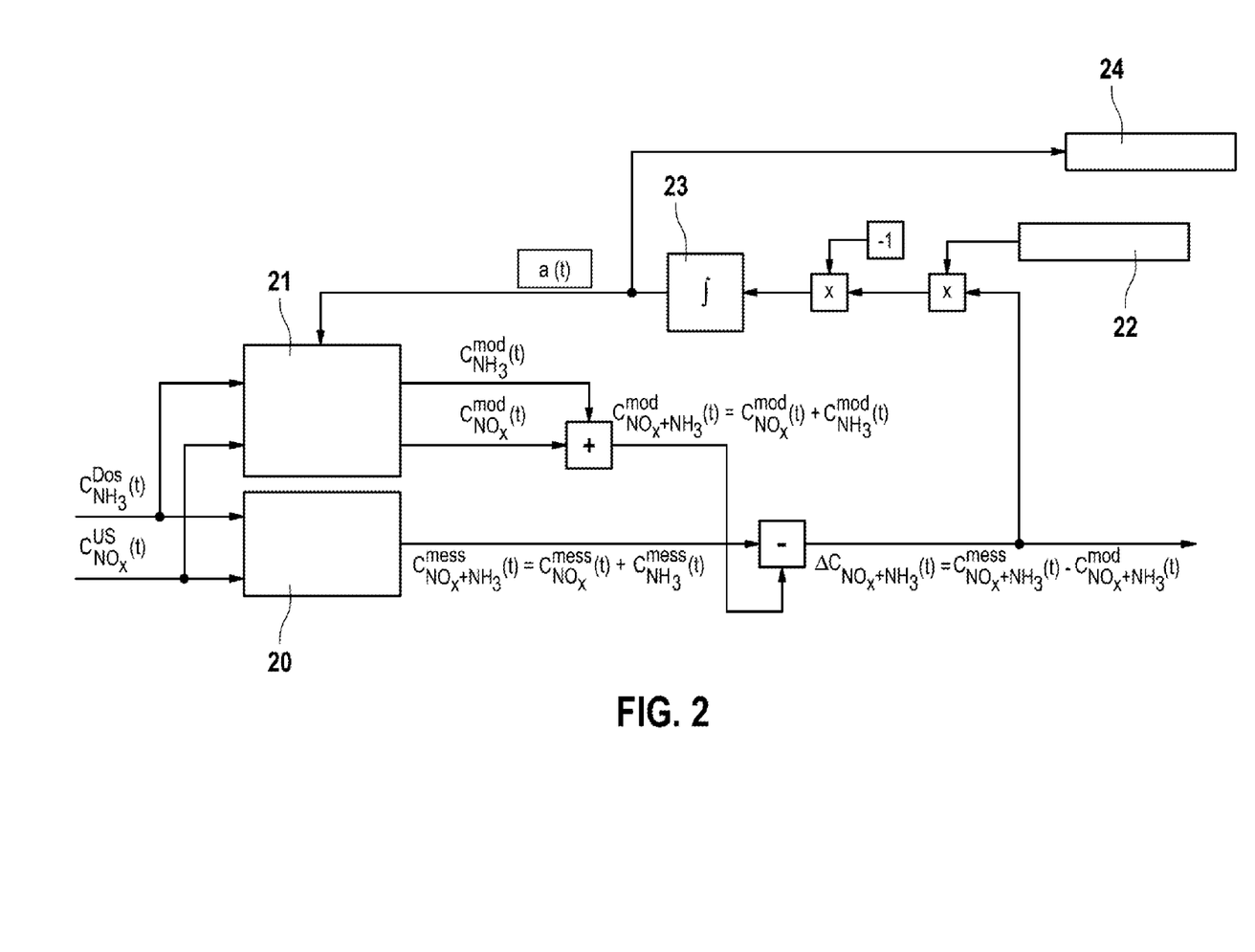
FIG. 2 shows an observer which is used in a method according to a working example of the invention.

In all the working examples described hereinafter, the method of the invention uses an observer structure as shown in FIG. 2. This is described hereinafter for the monitoring of the first SCR catalyst 12. An ammonia concentration to be dosed into the SCR catalyst 12 is calculated from an actuation of the first dosage module 14. A nitrogen oxide concentration ca, upstream of the SCR catalyst 12 can be either measured by means of the first nitrogen oxide sensor 16 or ascertained by means of a model. These two input parameters are used by the electronic control device 19 for control 20 of the first SCR catalyst 12. In addition, they are supplied to a kinetic model 21 of the first SCR catalyst 12. The second nitrogen oxide sensor 17, owing to its cross-sensitivity to ammonia, gives an exhaust gas signal $c_{NO_x+NH_x}^{mess}$ corresponding to the sum total of the concentration $c_{NO_x}^{mess}$ of nitrogen oxides and the concentration $c_{NH_x}^{mess}$ of ammonia downstream of the first SCR catalyst 12. In the kinetic model 21, these two individual concentrations are modeled, and the modeled nitrogen oxide concentration $c_{NO_x}^{mod}$ and the modeled ammonia concentration $c_{NH_x}^{mod}$ are used to create a modeled cumulative signal $c_{NO_x+NH_x}^{mod}$. Subsequently, a difference $\Delta c_{NO_x+NH_x}$ between the measured exhaust gas signal $c_{NO_x+NH_x}^{mess}$ and the modeled cumulative signal $c_{NO_x+NH_x}^{mod}$ is created.

The illustrative model equations of the kinetic model 21 for the NOx and NH3 concentration beyond the SCR catalyst and for the loading level θ are represented in the formulae that follow. The symbols mean:

$c_{NOx,US}$: concentration upstream of the SCR catalyst
$K_{NOx}$: frequency factor for NOx reaction
$K_{Des}$: frequency factor for NH3 desorption
$K_{Ads}$: frequency factor for NH3 adsorption
$E_{ADs}$: activation energy for NH3 adsorption
$E_{Des}$: activation energy for NH3 desorption
$E_{NOx}$: activation energy for NOx reaction
θ: NH3 loading level
$m_{NH3}$: current amount of NH3 stored in the SCR catalyst results from the balance of the amounts of NH3 flowing in and out
$m_{NH3}^{MAX}$: maximum amount of NH3 stored in a new SCR catalyst
R: gas constant
T: catalyst temperature
a: area factor
ε: correction factor to reflect the nonlinearity of desorption
$c_{NH3}$: NH3 concentration in the gas phase (derived from the dosage)
$c_{NOx}$: NOx concentration in the gas phase
$t_V$: dwell time of the exhaust gas in the catalyst Equations to describe the reaction kinetics:
Reaction rate of NH3 adsorption:

$$r_{Ads} = aK_{Ads}c_{NH3}(1-\theta)e^{-\frac{E_{Ads}}{RT}}$$

Reaction rate of NH3 desorption:

$$r_{Des} = aK_{Des}\theta e^{-\frac{E_{Des}(1-s\theta)}{RT}}$$

Reaction rate of NOx reaction:

$$r_{NOx} = aK_{NOx}c_{NOx}\theta e^{-\frac{E_{NOx}}{RT}}$$

Equations for modeled NOx and NH3 concentration $$c_{NOx}^{mod}(t) = c_{NOx,US}e^{-aK_{NOx}\theta t_V}e^{\left(-\frac{E_{NOx}}{RT}\right)}$$

$$C_{NH3}^{mod}(t) = \frac{K_{Des}}{K_{Ads}}\frac{\theta}{1-\theta}e^{E_{ADs}-E_{Des}(1-s\theta)}$$

with $$\theta = \frac{m_{NH3}}{a\,m_{NH3}^{MAX}}$$

The modeling is based on a reaction kinetics approach in which, among other reactions, the NOx reaction and the NH3 adsorption and desorption are also represented with the aid of the Arrhenius equation. In order to arrive at the equations shown in the example, some simplifications were made.

The area factor described above is a factor between 0 and 1 that describes the aging state of the catalytically active surface. If the factor is 1, the surface corresponds to that of a new SCR catalyst. As the factor decreases, the catalytically active surface area is reduced. With area factor=0, an inactive, i.e. uncoated, SCR catalyst is thus represented. The surface area can be reduced by aging and poisoning effects.

The formulae detailed above show, by way of example, the influence of the area factor on the system characteristics. A reduction on the one hand increases the modeled NH3 concentration and on the other hand reduces the NOx conversion, which leads to an elevated NOx concentration. The area factor also affects possible further reactions, for example that of NH3 oxidation and that of hydrolysis.

This representation of the aging or effective surface area can be implemented in all reaction kinetics models (according to Arrhenius) irrespective of their exact execution.

What this means for the observer approach described is that the two starting parameters (NOx and NH3 concentration) and their sum total can be used to conclude the catalytic surface area. This is especially advantageous since NOx sensors that emit a cumulative signal of NOx+NH3 concentration are usually used.

This is amplified by an observer 22 by multiplication by a factor. The factor is chosen depending on parameters of the SCR catalyst 12, including its temperature, its temperature gradient, an exhaust gas mass flow rate upstream of the SCR catalyst 12 and a nitrogen oxide mass flow rate upstream of the SCR catalyst 12, and a modeled ammonia mass flow rate downstream of the SCR catalyst 12. If enablement conditions are not fulfilled for the monitoring of the SCR catalyst 12, the amplification factor can also be set at 0. The result of the amplification is multiplied by a factor of −1 and sent to an integrator 23. This gives an area factor a that can assume values in the range from 0 to 1. The area factor a is used firstly for correction of the kinetic model 21 and secondly sent to an on-board diagnosis evaluation 24. It is ascertained therein, by comparison of the area factor a with a threshold value, whether the SCR catalyst 12 is intact for the purposes of the OBD, i.e. is a WPA catalyst, or whether it should be regarded as faulty for the purposes of the OBD, i.e. is a BPU catalyst.

For derivation of the illustrative observer, the area factor a is introduced as an additional state which is invariable and hence its derivative is 0.

$$\frac{da}{dt} = 0$$

This is supplemented as an additive term by the observer term with the observer amplification L (Luenberger observer) which is generally present in this formula $$\frac{da}{dt} = 0 + L(c_{NOx+NH3}^{mess}(t) - c_{NOx+NH3}^{mod}(t))$$

L is, in the case of the observer, for the area factor $(-1)*f_{Obs}$ ($f_{Obs}$ here is the observer amplification factor, which can be altered as a function of particular conditions; see below), which, after integration in block 23 over a period $t_{Eval}$, leads to the following calculation method for a:

$$a = \int_0^{t_{Eval}} -f_{Obs}(c_{NO_x+NH_x}^{mess}(t) - c_{NO_x+NH_x}^{mod}(t))dt$$

In a further execution, in the case of use of a multigas sensor that can give a separate output for NOx and NH3, the observer can react separately to variances in NOx and NH3. For example, the amplification can be determined individually. This is also true of the dependences of the amplification on further parameters that are detailed below.

Figure 3:
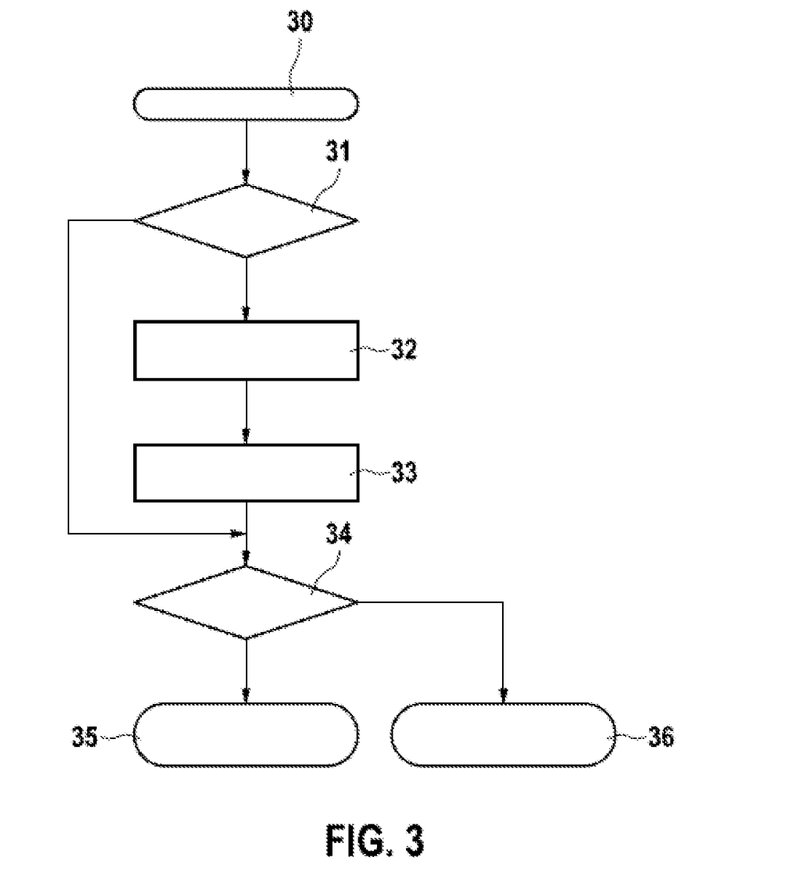
FIG. 3 shows a flow diagram of a method in a working example of the invention.

In one working example of the method of the invention which is shown in FIG. 3, after a start 30 of monitoring, a test 31 is first conducted as to whether the enablement conditions for the monitoring are fulfilled. These enablement conditions include the enablement of the dosage module 14 and that of nitrogen oxide sensors 16, 17 involved in the monitoring. If enablement is approved, a calculation 32 calculates a trust factor in the observer 22 by which the difference $\Delta c_{NO_x+NH_x}$ should be amplified. Using this trust factor, there is a recalculation 33 of the area factor a which is given to the kinetic model 21 and to the OBD evaluation 24. In the OBD evaluation 24, the area factor a is compared to a threshold value. If it has been found beforehand in the test 31 that the conditions for the monitoring are not met, the observer 22 is frozen and the comparison 34 is made by means of the last stored value of the area factor a. On the basis of the comparison 34, a decision is made as to whether the SCR catalyst 12 is intact 35, i.e. is a WPA catalyst, or is defective 36, i.e. is a BPU catalyst.

Figure 4:
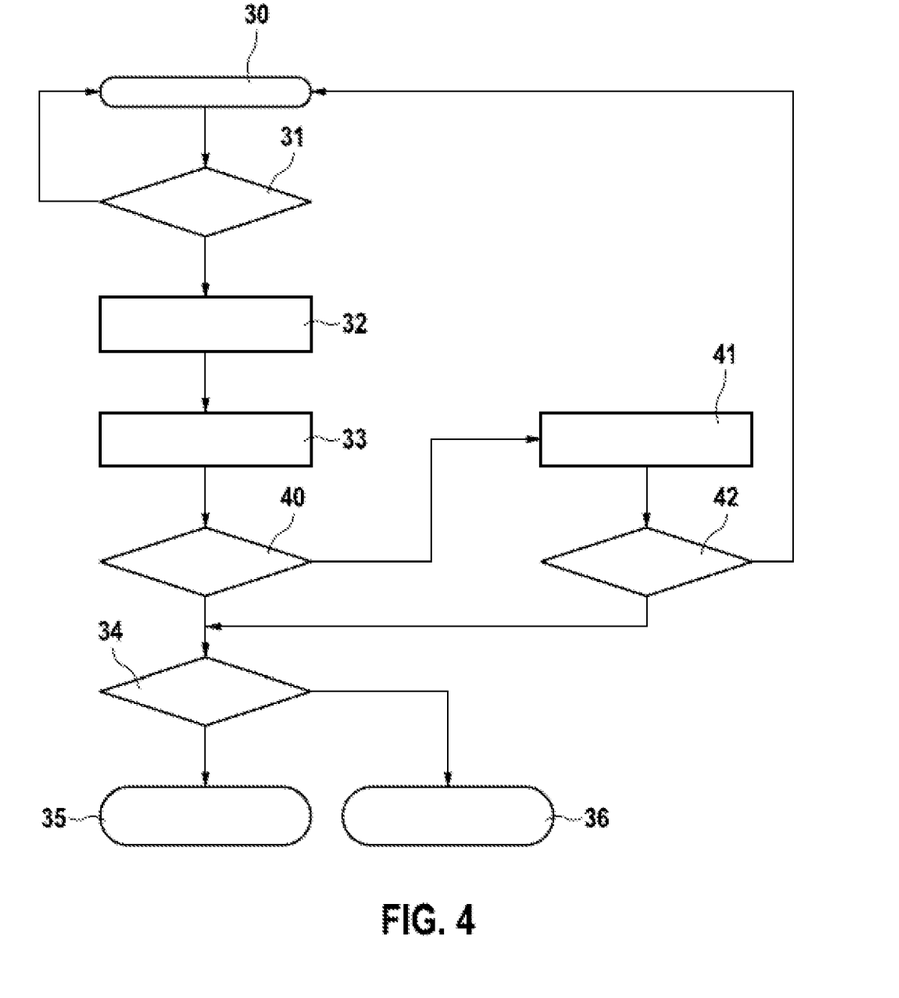
FIG. 4 shows a flow diagram of a method in another working example of the invention.

A second working example of the method of the invention is shown in FIG. 4. In this method, when the test 31 shows that the enablement conditions are not met, the monitoring is stopped until enablement is approved. After the calculation 33 of the area factor a, it is not compared immediately with the threshold value in step 34. Instead, a further test 40 is first carried out as to whether a change in the area factor a exceeds a change threshold value or whether monitoring is still in a teach-in phase for the area factor a. Only when neither of these conditions is fulfilled is the method continued with step 34. Otherwise, a teach-in phase for the area factor a is initialized and started 41. If a test 42 shows that the teach-in phase has been completely ended, the method is continued with step 34. Otherwise, it returns to the start 30.

Figure 5:
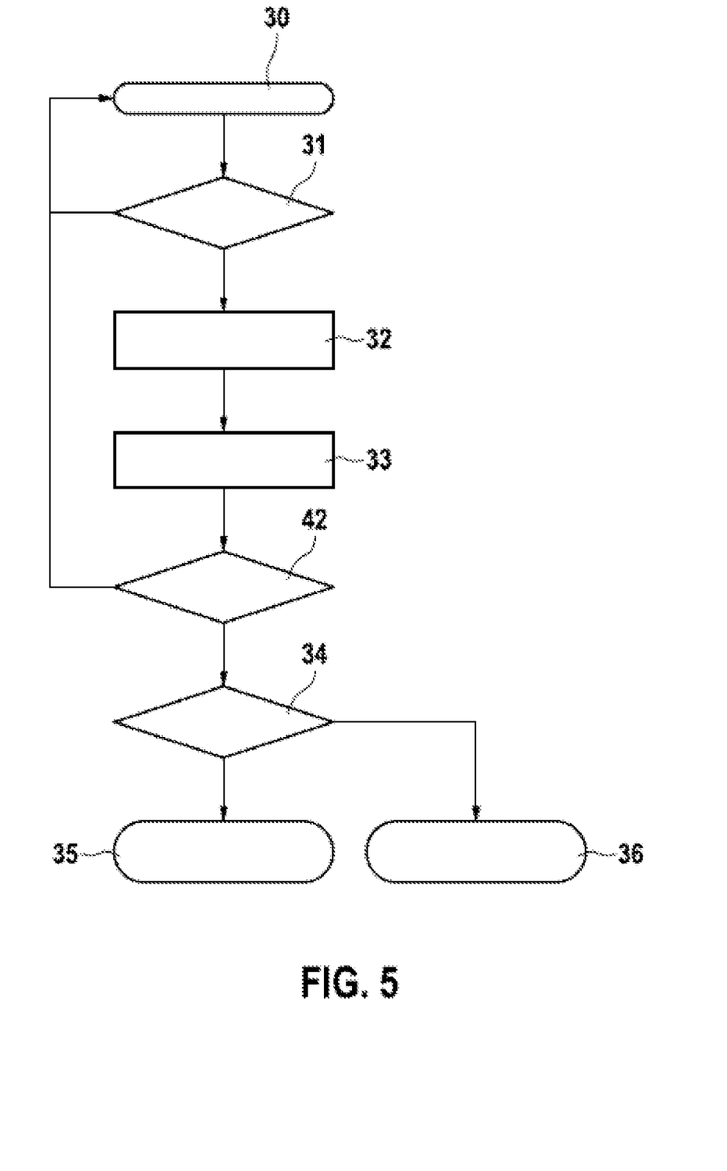
FIG. 5 shows a flow diagram of a method in yet another working example of the invention.

A third working example of the method of the invention is shown in FIG. 5. In a departure from the second working example, this dispenses with steps 40 and 41 and instead envisages merely the test 42 as to whether a teach-in phase has ended between the calculation 33 of the area factor and the comparison 34 of the area factor with the threshold value. If this condition is not met, the method returns to the start 30.

Figure 6:
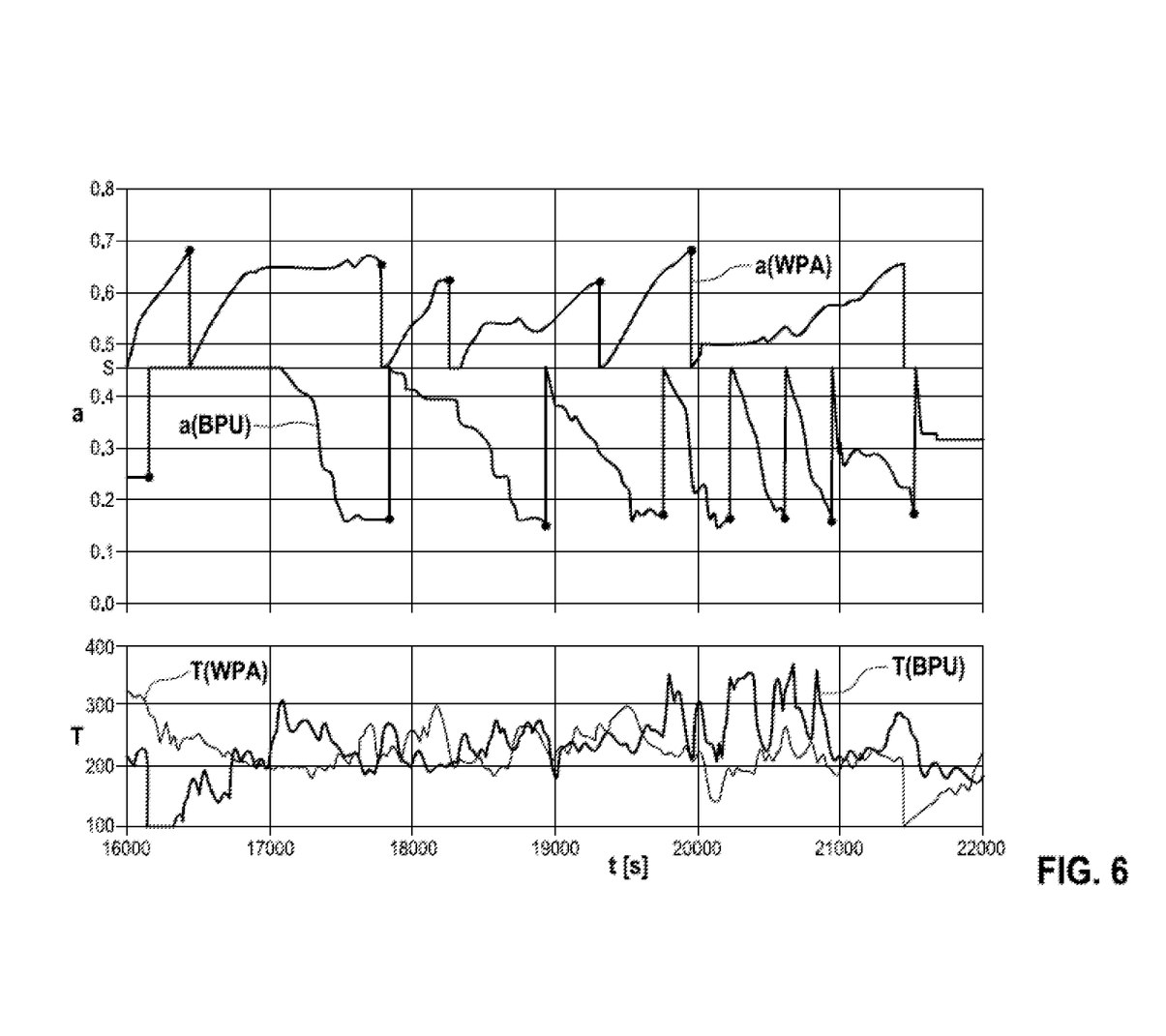
FIG. 6 shows, in two diagrams, the progression of an area factor and of a temperature of an SCR catalyst against time in one working example of the method of the invention.
Figure 7:
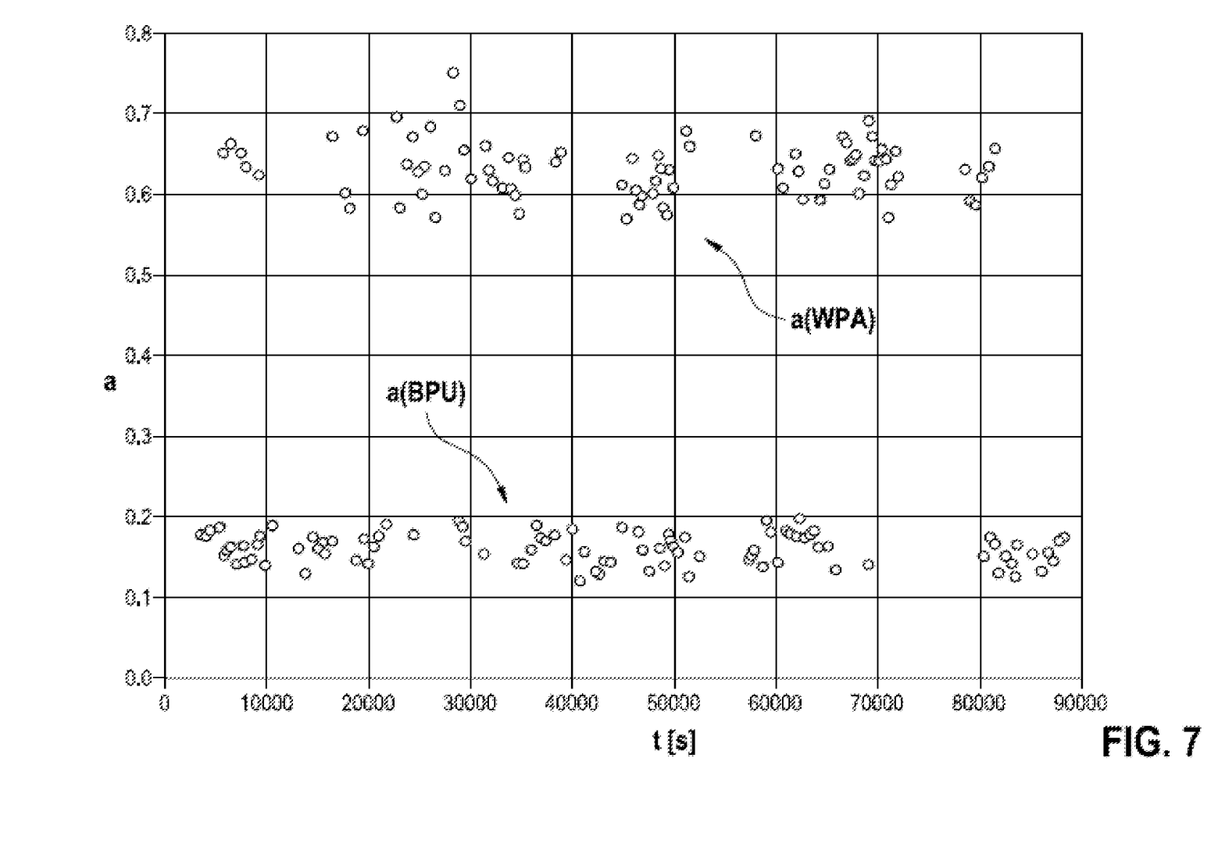
FIG. 7 shows, in a diagram, monitoring values of an area factor in a working example of the method of the invention.

FIG. 6 shows the progression of the area factor a and the temperature T of the SCR catalyst 12, in each case for a WPA catalyst and for a BPU catalyst, with time t. Each point in this diagram indicates the start of a teach-in phase. In this teach-in phase, the area factor a is in each case initialized to the threshold value S, which in the present case is 0.45. Proceeding from the initialization value, the area factor a (WPA) of the WPA catalyst subsequently assumes values above the threshold value S, and the area factor a (BPU) of the BPU catalyst assumes values below the threshold value S. Illustrative individual values of the area factor a for the WPA catalyst and for the BPU catalyst are each shown in FIG. 7 after the teach-in phase has elapsed.

The invention claimed is:

1. A method of monitoring an SCR catalyst (12), the method comprising:
ascertaining, via an observer (22), an area factor (a) of the SCR catalyst (12); and
determining (36) that there is a fault in the SCR catalyst (12) when a comparison (34) shows that the area factor (a) has gone below a threshold value (S), wherein the area factor (a) is ascertained (32) in that a difference ($\Delta c_{NO_x+NH_x}$) between a modeled exhaust gas signal ($c_{NO_x+HN_x}^{mod}$) upstream of the SCR catalyst (12) and a measured exhaust gas signal ($c_{NO_x+HN_x}^{mess}$) downstream of the SCR catalyst (12) is ascertained and the difference is amplified by the observer (22),
wherein the modeled exhaust gas signal ($c_{NO_x+HN_x}^{mod}$) and the measured exhaust gas signal ($c_{NO_x+HN_x}^{mess}$) are each a cumulative signal of a nitrogen oxide signal and an ammonia signal, and wherein the area factor (a) is taken into account for the modeled exhaust gas signal ($c_{NO_x+HN_x}^{mod}$).

2. The method according to claim 1, wherein the area factor can assume a value between 0 and 1 and the area factor (a) gives a reduction in a surface area of the SCR catalyst resulting from aging or damage.

3. The method according to claim 1, wherein, for the modeled exhaust gas signal ($c_{NO_x+HN_x}^{mod}$), the area factor is taken into account in a reaction equation for a NOx reaction, a NH3 adsorption and a NH3 desorption of the SCR catalyst.

4. The method according to claim 2, wherein the amplification depends on at least one value selected from the group consisting of a temperature (T) of the SCR catalyst (12), a temperature gradient of the SCR catalyst (12), an exhaust gas mass flow rate upstream of the SCR catalyst (12), a nitrogen oxide mass flow rate upstream of the SCR catalyst (12) and a modeled ammonia mass flow rate downstream of the SCR catalyst (12).

5. The method according to claim 1, wherein the observer (22) includes an integrator (23).

6. The method according to claim 1, wherein the comparison (34) of the area factor (a) with the threshold value (S) is made only after a teach-in phase for the observer (22) has elapsed.

7. The method according to claim 1, wherein the area factor (a) is initialized to the threshold value (S).

8. A non-transitory, machine-readable storage medium containing instructions that when executed by a computer cause the computer to monitor an SCR catalyst (12), by:
ascertaining, via an observer (22), an area factor (a) of the SCR catalyst (12); and determining (36) that there is a fault in the SCR catalyst (12) when a comparison (34) shows that the area factor (a) has gone below a threshold value (S), wherein the area factor (a) is ascertained (32) in that a difference ($\Delta c_{NO_x+NH_x}$) between a modeled exhaust gas signal ($c_{NO_x+HN_x}^{mod}$) upstream of the SCR catalyst (12) and a measured exhaust gas signal ($c_{NO_x+HN_x}^{mess}$) downstream of the SCR catalyst (12) is ascertained and the difference is amplified by the observer (22), wherein the modeled exhaust gas signal ($c_{NO_x+HN_x}^{mod}$) and the measured exhaust gas signal ($c_{NO_x+HN_x}^{mess}$) are each a cumulative signal of a nitrogen oxide signal and an ammonia signal, and wherein the area factor (a) is taken into account for the modeled exhaust gas signal ($c_{NO_x+HN_x}^{mod}$).

9. An electronic control device (19) configured to monitor an SCR catalyst (12) by ascertaining, via an observer (22), an area factor (a) of the SCR catalyst (12); and determining (36) that there is a fault in the SCR catalyst (12) when a comparison (34) shows that the area factor (a) has gone below a threshold value (S), wherein the area factor (a) is ascertained (32) in that a difference ($\Delta c_{NO_x+HN_x}$) between a modeled exhaust gas signal ($c_{NO_x+HN_x}^{mod}$) upstream of the SCR catalyst (12) and a measured exhaust gas signal ($c_{NO_x+HN_x}^{mess}$) downstream of the SCR catalyst (12) is ascertained and the difference is amplified by the observer (22), wherein the modeled exhaust gas signal ($c_{NO_x+HN_x}^{mod}$) and the measured exhaust gas signal ($c_{NO_x+HN_x}^{mess}$) are each a cumulative signal of a nitrogen oxide signal and an ammonia signal, and wherein the area factor (a) is taken into account for the modeled exhaust gas signal ($c_{NO_x+HN_x}^{mod}$).

\* \* \* \* \*